(12) United States Patent
Sakata

(10) Patent No.: US 9,260,019 B2
(45) Date of Patent: Feb. 16, 2016

(54) DRIVE SYSTEM AND VEHICLE INCLUDING DRIVE SYSTEM

(71) Applicant: Koichi Sakata, Okazaki (JP)

(72) Inventor: Koichi Sakata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 14/245,207

(22) Filed: Apr. 4, 2014

(65) Prior Publication Data
US 2014/0320047 A1    Oct. 30, 2014

(30) Foreign Application Priority Data

Apr. 25, 2013    (JP) ................................. 2013-092973

(51) Int. Cl.
| | |
|---|---|
| H02P 1/00 | (2006.01) |
| H02P 3/00 | (2006.01) |
| H02P 5/00 | (2006.01) |
| B60L 11/18 | (2006.01) |
| B60L 15/00 | (2006.01) |

(52) U.S. Cl.
CPC .............. *B60L 11/18* (2013.01); *B60L 15/007* (2013.01); *B60L 2210/12* (2013.01); *Y02T 10/7022* (2013.01); *Y02T 90/127* (2013.01)

(58) Field of Classification Search
CPC ......................... Y02T 10/7233; B60L 11/1851
USPC .......................................................... 318/139
See application file for complete search history.

(56) References Cited

U.S. PATENT DOCUMENTS

| | | | |
|---|---|---|---|
| 2009/0237016 A1 | 9/2009 | Iwashita et al. | |
| 2012/0055727 A1* | 3/2012 | Omiya et al. | 180/279 |
| 2014/0095005 A1* | 4/2014 | Kanzaki et al. | 701/22 |
| 2014/0265945 A1* | 9/2014 | Deboy | 318/139 |

FOREIGN PATENT DOCUMENTS

| | | |
|---|---|---|
| JP | A-2009-232537 | 10/2009 |
| JP | 2010-213406 A | 9/2010 |
| JP | A-2011-210026 | 10/2011 |

* cited by examiner

*Primary Examiner* — Erick Glass
(74) *Attorney, Agent, or Firm* — Oliff PLC

(57) ABSTRACT

A drive system includes a first switching unit, a first capacitor, a step-down circuit, a second capacitor, and a discharging unit. The first switching unit is configured to convert energy, stored in an electrical storage device, to electric power that is supplied to a motor. The first capacitor is connected to the first switching unit and configured to smooth voltage that is supplied from the electrical storage device to the first switching unit. The step-down circuit is connected to the first capacitor and configured to step down voltage of the first capacitor. The second capacitor is connected to the step-down circuit and configured to draw electric charge stored in the first capacitor. The discharging unit is configured to discharge electric charge stored in the second capacitor.

15 Claims, 4 Drawing Sheets

DRIVE SYSTEM AND VEHICLE INCLUDING DRIVE SYSTEM

INCORPORATION BY REFERENCE

The disclosure of Japanese Patent Application No. 2013-092973 filed on Apr. 25, 2013 including the specification, drawings and abstract is incorporated herein by reference in its entirety.

BACKGROUND OF THE INVENTION

1. Field of the Invention

The invention relates to a drive system and a vehicle including a drive system.

2. Description of Related Art

In recent years, electromotive vehicle, such as electric vehicles, hybrid vehicles and fuel-cell vehicles, that travel by driving a motor with electric power stored in a power supply device have become a focus of attention. These electromotive vehicles include a converter that outputs high-voltage direct-current power by stepping up voltage, supplied from the power supply device, to a predetermined voltage and a capacitor that smoothes the voltage output from the converter. These electromotive vehicles include an inverter that converts direct-current power, output from the converter, to alternating-current power and a drive motor that is driven by alternating-current power output from the inverter.

In such an electromotive vehicle, in order to improve the safety of the vehicle, it is required to quickly discharge the energy of high-voltage direct-current power stored in the capacitor in the event of collision of the vehicle. For example, in order to satisfy the standard associated with protection of an electric power control device, which is regulated in United States laws and regulations, that is, Federal Motor Vehicle Safety Standard (FMVSS) 305, it is required to set the voltage of the capacitor to a predetermined value or below within 5 seconds from a collision.

As a technique for rapidly discharging electric charge stored in a smoothing capacitor, there is, for example, a technique for causing the smoothing capacitor to generate heat by connecting a plurality of resistors to the smoothing capacitor.

In addition, there is a technique for adjusting the amount of electric charge that is stored in a smoothing capacitor by connecting a capacitor in parallel with the smoothing capacitor (for example, see Japanese Patent Application Publication No. 2011-210026 (JP 2011-210026 A) and Japanese Patent Application Publication No. 2009-232537 (JP 2009-232537 A)).

However, in the above-described related techniques, a resistor having a large rated power is required, so a system including a heat dissipation cooling device may increase in size. In addition, it is difficult to control the voltage of the smoothing capacitor only by connecting a capacitor in parallel with the smoothing capacitor.

SUMMARY OF THE INVENTION

The invention provides a drive system and a vehicle that quickly control the voltage of a smoothing capacitor to a predetermined value or below.

A drive system according to a first aspect of the invention includes a first switching unit, a first capacitor, a step-down circuit, a second capacitor and a discharging unit. The first switching unit is configured to convert energy, stored in an electrical storage device, to electric power that is supplied to a motor. The first capacitor is connected to the first switching unit and configured to smooth voltage that is supplied from the electrical storage device to the first switching unit. The step-down circuit is connected to the first capacitor and configured to step down voltage of the first capacitor. The second capacitor is connected to the step-down circuit and configured to draw electric charge stored in the first capacitor. The discharging unit is configured to discharge electric charge stored in the second capacitor.

A vehicle according to a second aspect of the invention includes the drive system according to the first aspect of the invention.

According to the aspects of the invention, it is possible to provide a drive system and a vehicle that quickly control the voltage of a smoothing capacitor to a predetermined value or below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
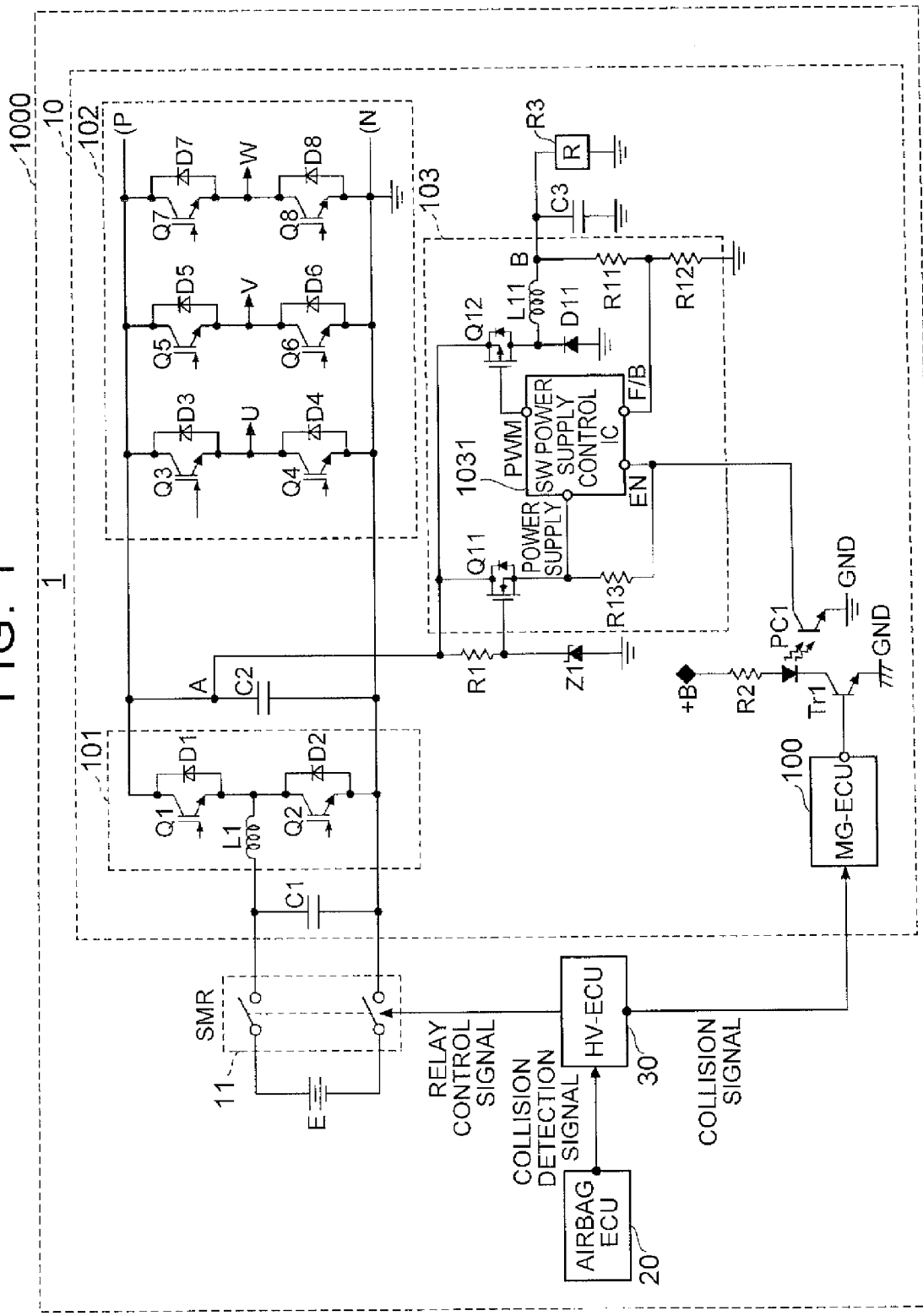
FIG. 1 is an overall configuration view of a drive system according a first embodiment.

Hereinafter, an embodiment of the invention will be described with reference to the accompanying drawings. FIG. 1 is an overall configuration view of a drive system according to a first embodiment that will be described as an example of the embodiment. In the first embodiment, the drive system 1 is, for example, mounted on an electromotive vehicle, such as an electric vehicle, a hybrid vehicle and a fuel-cell vehicle.

In FIG. 1, the drive system 1 includes an electrical storage device E, a drive control device 10, a system main relay (SMR) 11, an airbag electronic control unit (ECU) 20 and a hybrid vehicle (HV)-ECU 30.

The electrical storage device E is a battery that stores direct-current power, and is, for example, a secondary battery, such as a lithium ion battery, a nickel metal hydride battery and a lead-acid battery. The electrical storage device E supplies a motor generator (MG) (not shown) with electric power for propelling the vehicle 1000. The MG is connected to three U-phase, V-phase and W-phase wires (shown in the drawing) of an inverter unit 102 (described later). The electrical storage device E stores electric power generated by the MG during regenerative operation for regenerating electric power generated by the MG.

The SMR 11 opens or closes the path between the electrical storage device E and the drive control device 10. The SMR 11 is a double-pole single-throw relay, and is controlled by a relay control signal from the HV-ECU 30.

The airbag ECU 20 includes a collision detection sensor that detects a collision of the vehicle 1000. The airbag ECU 20 outputs a collision detection signal to the HV-ECU 30 when a collision of the vehicle 1000 is detected by the sensor.

The airbag ECU 20 and the HV-ECU 30 are configured to be able to communicate with each other through inter-ECU communication.

The HV-ECU 30 comprehensively controls a hybrid system of the overall vehicle with the use of the drive control device 10 and an engine (not shown). The HV-ECU 30 outputs the relay control signal to the SMR 11 and outputs a collision signal to an MG-ECU 100 (described later) included in the drive control device 10 when the collision detection signal is input from the airbag ECU 20. The SMR 11 to which the control signal is input isolates the electrical storage device E and the drive control device 10 from each other such that no energy of the electrical storage device E is supplied to the drive control device 10.

The drive control device 10 includes the MG-ECU 100, a converter unit 101, the inverter unit 102 and a down-converter unit 103. The drive control device 10 includes capacitors C1 to C3, resistors R1 to R3 and a Zener diode Z1. In FIG. 1, R1 and C3 serve as a resistor or a discharging mechanism. The inverter unit 102 may be regarded as a first switching unit according to the invention. The down-converter unit 103 may be regarded as a step-down circuit according to the invention. The capacitor C2 may be regarded as a first capacitor according to the invention. The capacitor C3 may be regarded as a second capacitor according to the invention.

The MG-ECU 100 drives the MG by controlling the converter unit 101 and the inverter unit 102.

The converter unit 101 includes switching elements Q1, Q2, diodes D1, D2 and a reactor L1. The switching elements Q1, Q2 step up direct-current voltage, output from the electrical storage device E, to a predetermined voltage by using the duty ratio of switching operation, and supply the direct-current voltage to the inverter unit 102. The duty ratio is controlled by the MG-ECU 100. The converter unit 101 steps down direct-current voltage, supplied from the inverter unit 102, through switching operation. The step-down operation of the converter unit 101 is carried out by releasing electromagnetic energy, stored in the reactor L1 during an on period of the switching element Q1, via the switching element Q2 and the diode D2. The reactor L1 is connected in series with a positive electrode of the electrical storage device E, and forms an LC smoothing circuit together with the capacitor C1 connected in parallel with the electrical storage device E. The reactor L1 reduces voltage fluctuations in the electrical storage device E. In the present embodiment, the switching elements Q1 to Q8 are illustrated as IGBTs. Therefore, each of the diodes D1 to D8 for commutating load current is connected between the collector and emitter of a corresponding one of the switching elements Q1 to Q8 so as to be opposite in phase with respect to the collector and emitter of the corresponding one of the switching elements Q1 to Q8.

The capacitor C2 is connected in parallel with the collector of the switching element Q1 and the emitter of the switching element Q2, which correspond to an output of the converter unit 101. Point A in the drawing is a connection point of the collector of the switching element Q1 and one end of the capacitor C2. The capacitor C2 serves as a smoothing capacitor that smoothes direct-current voltage that is stepped up by the converter unit 101 and supplied to the inverter unit 102.

The inverter unit 102 includes the switching elements Q3 to Q8. The switching elements Q3 to Q8 undergo switching control by the MG-ECU 100, and convert direct-current power, which is output from the converter unit 101, to alternating-current power that is supplied to the U phase, V phase and W phase of the MG to drive the MG. The switching element Q3 and the diode D3 form a U-phase upper arm. The collector of the switching element Q4 is connected to the emitter of the switching element Q3. The switching element Q4 and the diode D4 form a U-phase lower arm. A connection point of the U-phase upper and lower arms is connected to the U phase of the MG. Similarly, a connection point of V-phase upper and lower arms that are formed of the switching elements Q5, Q6 and the diodes D5, D6 is connected to the V phase of the MG. A connection point of W-phase upper and lower arms that are formed of the switching elements Q7, Q8 and the diodes D7, D8 is connected to the W phase of the MG. The inverter unit 102 controls the output torque and rotation speed of the MG by U-phase, V-phase and W-phase current outputs. When the MG is operated for regeneration, the inverter unit 102 converts alternating-current power to direct-current power, and electric energy is stored in the electrical storage device E via the converter unit 101.

The down-converter unit 103 executes control for releasing electric energy, stored in the capacitor C2, in the event of collision of the vehicle 1000. The down-converter unit 103 includes switching elements Q11, Q12, a switching (SW) power supply control IC 1031, a reactor L11, resistors R11 to R13 and a diode D11. The switching elements Q11, Q12 are illustrated as MOSFETs in the present embodiment. The switching element Q11 is an n-channel MOSFET, and a diode is connected from the drain to the source of the switching element Q11 in opposite phase. The switching element Q12 is a p-channel MOSFET, and a commutating diode is connected from the drain to the source of the switching element Q12. The switching element Q12 may be regarded as a second switching unit according to the invention.

The down-converter unit 103 is connected to Point A that is one end of the capacitor C2. The capacitor C3 and the resistor R3 are connected to the down-converter unit 103. The resistor R3 may be regarded as a discharging unit according to the invention.

The SW power supply control IC 1031 includes a power supply terminal for supplying power to the SW power supply control IC 1031, an enable terminal EN that turns on or off the operation of the SW power supply control IC 1031, a PWM terminal that serves as a pulse width modulation (PWM) control output terminal, and a feedback (F/B) terminal for inputting a voltage value in a feedback manner. The switching element Q12 is connected to the PWM terminal. Hereinafter, the enable terminal EN may be referred to as EN terminal.

One end of the resistor R1 is connected to Point A, and the Zener diode Z1 is connected in series with the other end of the resistor R1. A breakdown voltage of the Zener diode Z1 is kept at a connection point of the resistor R1 and the Zener diode Z1. The connection point of the resistor R1 and the Zener diode Z1 is connected to the gate of the switching element Q11. The source of the switching element Q11 is connected to one end of the resistor R13, and is connected to the power supply terminal of the SW power supply control IC 1031 at that connection point. The other end of the resistor R13 is connected to the EN terminal of the SW power supply control IC 1031. The EN terminal is connected to the collector of a photocoupler PC1. The emitter of the photocoupler PC1 is grounded to a ground. That is, when the photocoupler PC1 is in an on state, the EN terminal is grounded and enters a low state, and the SW power supply control IC 1031 stops its operation. On the other hand, when the photocoupler PC1 is in an off state, voltage that occurs due to the resistor R13 is applied to the EN terminal and enters a high state. Therefore, the SW power supply control IC 1031 operates, that is, starts up.

During normal times, the MG-ECU 100 keeps the base voltage of a transistor Tr1 in a high state. Therefore, during normal operations, the photocoupler PC1 is in the on state, and the SW power supply control IC 1031 does not operate. On the other hand, when a collision signal is input from the HV-ECU 30, the MG-ECU 100 causes the transistor Tr1 to enter a low state. Therefore, the photocoupler PC1 turns off, and the SW power supply control IC 1031 operates. The photocoupler PC1 turns off, for example, even when a power supply voltage +B is lost or even when the MG-ECU 100 fails. Therefore, it is possible to cause the SW power supply control IC 1031 to operate for fail safe.

When the EN terminal of the SW power supply control IC 1031 enters a high state and the SW power supply control IC 1031 operates, the PWM terminal carries out switching control output to the gate of the switching element Q12 at a predetermined duty ratio, and turns on the switching element Q12. When the switching element Q12 turns on, electric charge stored in the capacitor C2 is stepped down to an FMVSS 305-regulated voltage or below by the switching element Q12 from Point A, and is transferred to the capacitor C3 via the reactor L11 within a predetermined period of time. The capacitor C3 is assumed to have a capacitance sufficient to decrease the voltage of the capacitor C2 by drawing electric charge in the capacitor C2. The reactor L11 serves as a choke coil to smooth the amount of current flowing in as a result of the on state of the switching element Q12, and prevents a breakdown of the switching element Q12 due to inrush current. The reactor L11 stores energy in a period during which the switching element Q12 is in an on state. The reactor L11 releases stored energy in a period during which the switching element Q12 is in an off state, and supplies current to the capacitor C3 by using current passing through the diode D11. Thus, half-wave rectification is carried out in the on period and off period of the switching element Q12, so it is possible to supply large current to the capacitor C3.

The resistor R11 and the resistor R12 are connected in series with Point B between the reactor L11 and the capacitor C3, and grounded. A connection point of the resistor R11 and the resistor R12 is connected to the F/13 terminal of the SW power supply control IC 1031. The SW power supply control IC 1031 executes feedback control for setting a voltage at Point B to a predetermined value by adjusting a switching rate of Q12 on the basis of the input voltage value.

Electric charge stored in the capacitor C3 is discharged by the resistor R3. The resistor R3 is, for example, able to use a discharger. The voltage of the capacitor C3 is lower than or equal to the voltage value regulated in FMVSS 305, so electric charge stored in the capacitor C3 may be discharged slowly. Thus, the resistor R3 is allowed to use a resistor having a small rated power capacity, and can contribute to a reduction in size and weight of the drive system 1.

The functions of the drive system 1 shown in FIG. 1 may be implemented by executing software, stored in a memory (not shown), on a CPU. The functions of the drive system 1 may also be implemented by exclusive hardware.

Some of the functions described in FIG. 1 may be implemented as one unit together. For example, the airbag ECU 20 and the HV-ECU 30 may be implemented by a single ECU. One function may be divided and implemented by a plurality of devices.

Next, the operation according to the first embodiment will be described with reference to FIG. 2A to FIG. 2I. FIG. 2A to FIG. 2I are time charts that illustrate one example of the operation of the drive system.

In FIG. 2A to FIG. 2I, FIG. 2A shows an impact pulse that occurs due to a collision of the vehicle 1000. The abscissa axes of FIG. 2A to FIG. 2I represent time axis.

Figure 2:
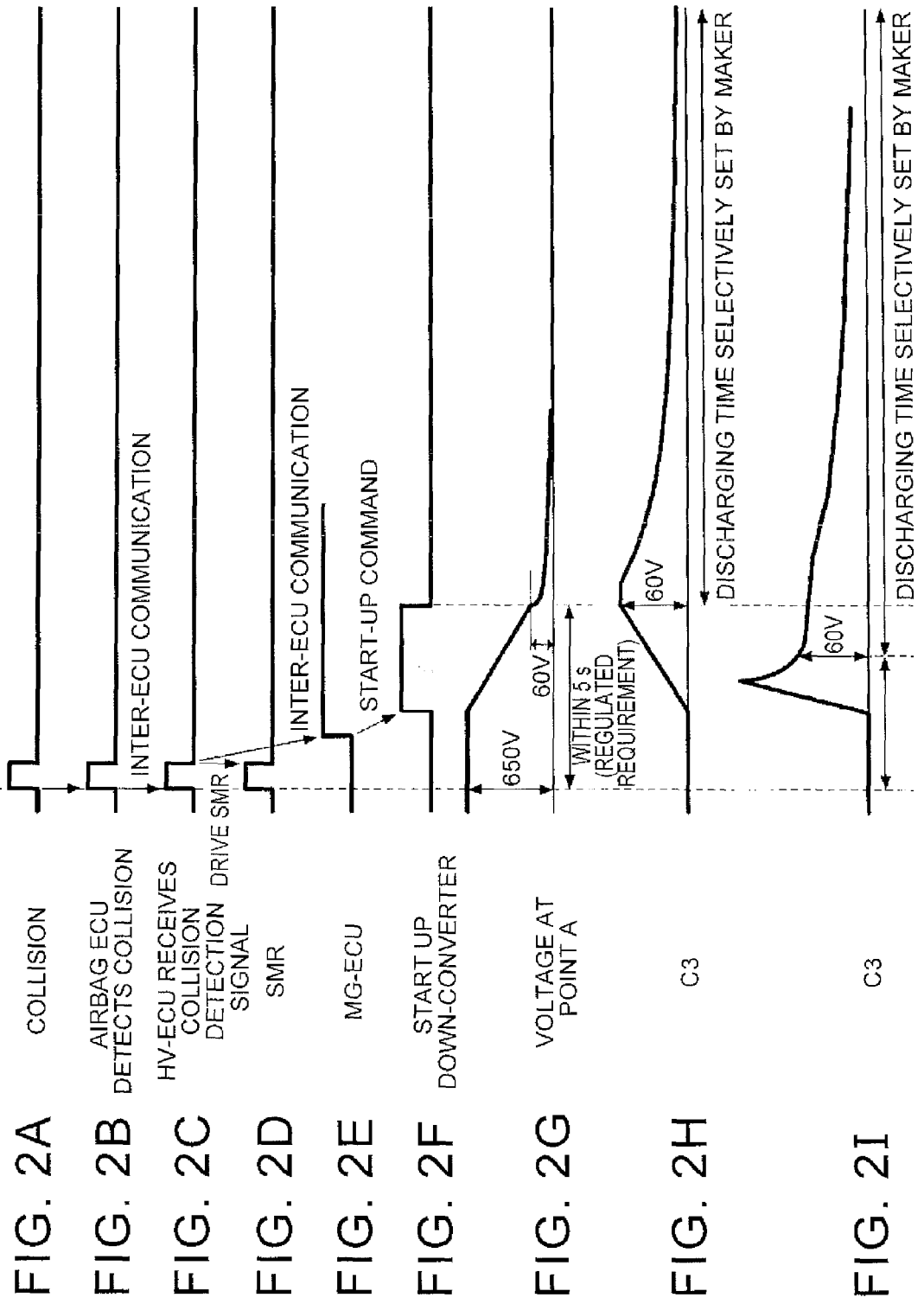
FIG. 2A to FIG. 2I are time charts that illustrate the operation of the drive system according to the first embodiment.

FIG. 2B shows a state that the airbag ECU 20 detects the impact pulse and outputs a collision detection signal to the HV-ECU 30. The airbag ECU 20 includes the collision detection sensor, detects the collision of the vehicle 1000 in response to a rise in the impact pulse, and outputs the collision detection signal to the HV-ECU 30.

FIG. 2C and FIG. 2D show a state where the HV-ECU 30 to which the collision detection signal is input causes the SMR 11 to enter an open state by outputting a relay control signal to the SMR 11. In this graph, the relay control signal is output at a fall in the collision detection signal; instead, the relay control signal may be output at a rise in the collision detection signal.

FIG. 2C and FIG. 2E show a state where the HV-ECU 30 to which the collision detection signal is input outputs a collision signal to the MG-ECU 100, and the MG-ECU 100 causes the base voltage of the transistor Tr1, described with reference to FIG. 1, to enter a low state and causes the photocoupler PC1 to enter an off state. The collision signal as well as the relay control signal may also be output at a rise in the collision detection signal.

FIG. 2F shows a state where the EN terminal of the SW power supply control IC 1031 of the down-converter unit 103 enters a high state, and the PWM terminal of the SW power supply control IC 1031 carries out switching output. Switching is controlled such that a voltage at Point B in FIG. 1 becomes, for example, 60 V.

FIG. 2G shows a voltage change at Point A in FIG. 1. The down-converter unit 103 causes electric energy of 650 V, stored in the capacitor C2, to decrease to 60 V or below within 5 seconds regulated in FMVSS 305. In this graph, switching is stopped in the down-converter unit 103 at the timing at which the voltage at Point A becomes lower than or equal to 60 V; however, switching may be continued to a voltage further lower than 60 V.

FIG. 2H is a change in the voltage of the capacitor C3. The voltage of the capacitor C3 increases at a predetermined time constant to a voltage set by the down-converter unit 103, electric energy stored in the capacitor C3 is consumed over time at a predetermined time constant due to the resistor R3, and the voltage drops. FMVSS 305 does not regulate a discharging time for stored electric charge lower than or equal to the predetermined voltage value. For example, the discharging time may be selectively set by makers in consideration of requirements, such as the heat generation and mountability of the system. Thus, it is possible to discharge electric charge in the capacitor C3 slowly with the use of the resistor R3 having a small rated capacity.

FIG. 2I is a change in the voltage of the capacitor C3 when a voltage applied to the capacitor C3 by the down-converter unit 103 is increased to prescribed 60 V or above. The capacitor C3 in FIG. 2I is configured to have a capacitance and a withstand voltage larger than those of the capacitor C3 in FIG. 2H. Thus, in FIG. 2I, the amount of electric charge stored in the capacitor C3 is increased in a short period of time, and the voltage of the capacitor C3 is set to prescribed 60 V or below in a further short period of time as compared to FIG. 2H. That is, with the configuration shown in FIG. 2I, it is possible to more quickly decrease the voltage of the capacitor C2 by increasing the capacitance and withstand voltage of the capacitor C3. As described above, in the present embodiment, by executing appropriate discharging control in consideration of the regulations of FMVSS 305, it is possible to reduce the weight, size and cost of the discharging circuit.

Next, second to fourth embodiments in which the down-converter unit 103 described with reference to FIG. 1 is implemented as another configuration will be described with reference to FIG. 3 to FIG. 5. Like reference numerals denote the same components as the components described in the first embodiment in the drawings, and the overlap description is omitted.

The second embodiment differs from the first embodiment in that the feedback portion of the down-converter unit 103 described in the first embodiment is changed. FIG. 3 is a configuration view that shows one example of the configuration of a down-converter unit according to the second embodiment.

Figure 3:
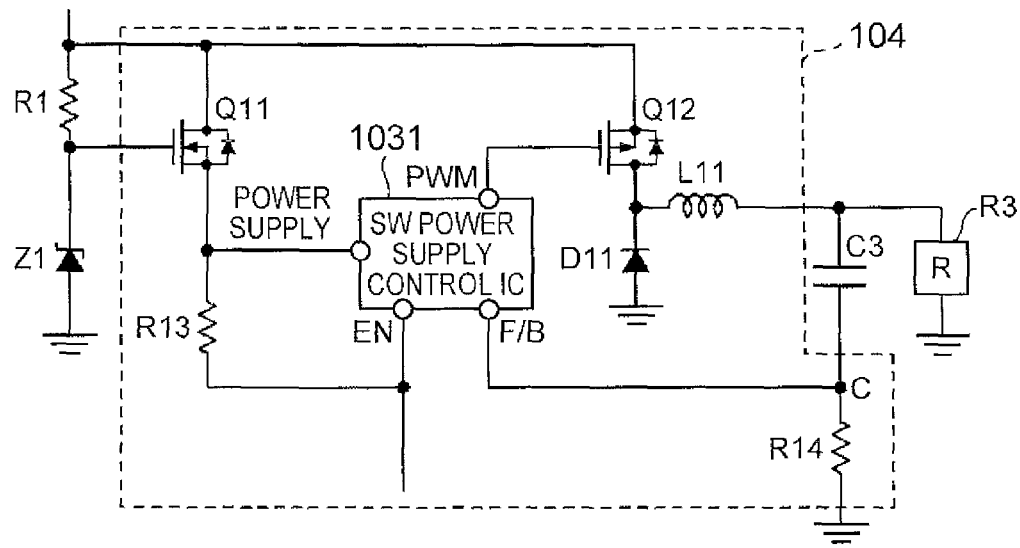
FIG. 3 is a configuration view of a down-converter unit according to a second embodiment.

In FIG. 3, in the down-converter unit 104, a resistor R14 is connected between the capacitor C3 and the ground, and a charging current for charging the capacitor C3 is detected by detecting a voltage at Point C that is a connection point of the resistor R14. Point C is connected to the F/B terminal of the SW power supply control IC 1031. The SW power supply control IC 1031 executes feedback control over switching of the switching element Q12 on the basis of the charging current. In the first embodiment, the voltage value is controlled by measuring the voltage at which the capacitor C3 is charged; whereas, in the second embodiment, the current flowing into that capacitor C3 is controlled. Therefore, it is possible to reduce ripple current at the time of the start of switching by the SW power supply control IC 1031.

A third embodiment differs from the first embodiment in that a flyback manner that uses a transformer T1 is employed instead of smoothing made by the reactor L11 in the first embodiment. FIG. 4 is a configuration view that shows one example of the configuration of a down-converter unit according to the third embodiment.

Figure 4:
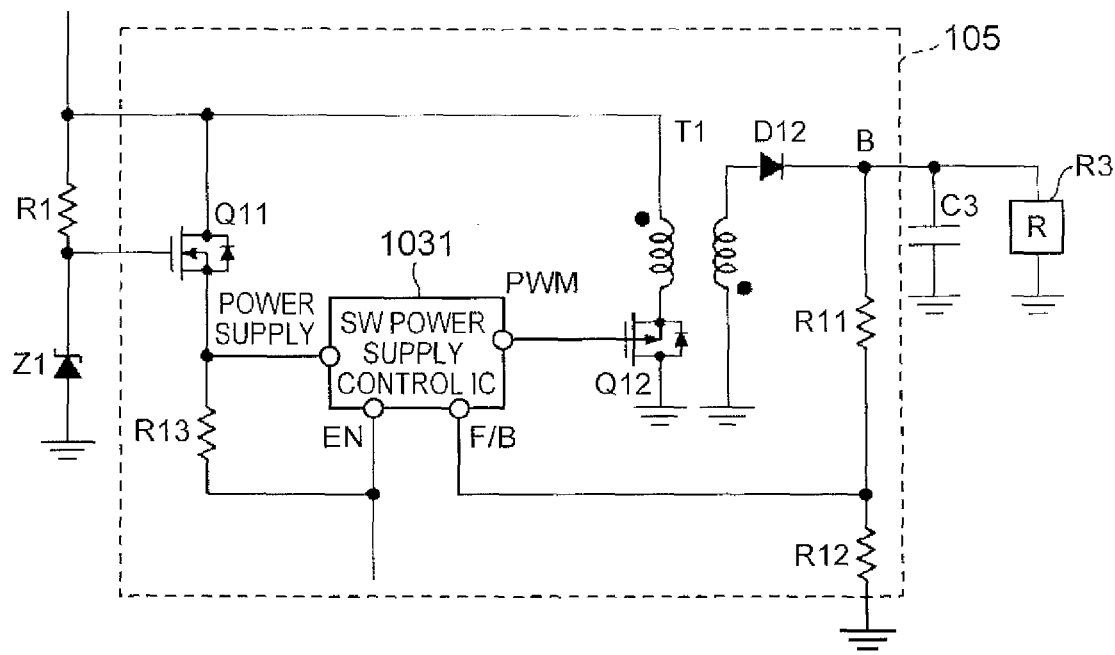
FIG. 4 is a configuration view of a down-converter unit according to a third embodiment.

In FIG. 4, Point A in FIG. 1 is connected to a primary side of the transformer T1. The transformer T1 is configured such that a primary coil and a secondary coil have opposite phases. The secondary coil of the transformer T1 connected in opposite phases, as well as the reactor L11 according to the first embodiment, smoothes current that undergoes switching by the switching element Q1. Thus, the reactor L11 is not required, and the number of components is allowed to be reduced. Owing to the effect of insulation between the primary coil and secondary coil of the transformer T1, it is possible to reduce ripple of current flowing into the capacitor C3. However, the amount of current flowing through the secondary coil of the transformer T1 directly flows into the capacitor C3. Therefore, in order to transfer electric charge, stored in the capacitor C2, to the low-voltage capacitor C3 in a short period of time, it is required to increase the rated current of the secondary coil of the transformer T1.

A fourth embodiment differs from the third embodiment in that a forward manner is employed instead of the flyback manner in the third embodiment. FIG. 5 is a configuration view that shows one example of the configuration of a down-converter unit according to the fourth embodiment.

Figure 5:
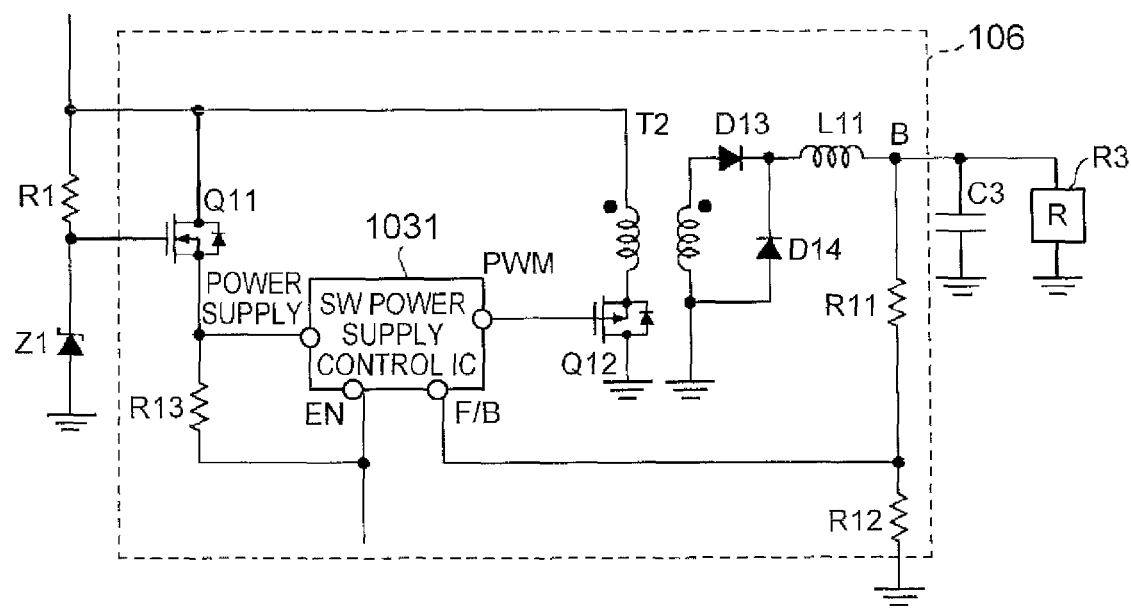
FIG. 5 is a configuration view of a down-converter unit according to a fourth embodiment.

In FIG. 5, a transformer T2 is configured such that a primary coil and a secondary coil have the same phase. The transformer T2 passes current to the same-phase secondary coil when the switching element Q12 is in the on-state. The current flowing through the secondary coil is changed into a half wave by the diodes D13, D14, and is smoothed by the reactor L11 and the capacitor C3 as in the case of the first embodiment. It is possible to reduce ripple that flows into the capacitor C3 as in the case of the third embodiment owing to insulation of the transformer T2. In addition, as in the case of the first embodiment, current is flowed through the capacitor C3 via the diode D14 by using energy stored in the reactor L11 when the switching element Q12 is in the off state, so it is possible to increase the current value.

The modes for carry out the invention are described in detail above; however, the invention is not limited to those example embodiments, and various modifications and alterations are possible.

What is claimed is:

1. A drive system comprising:
a first switching unit configured to convert energy, stored in an electrical storage device, to electric power that is supplied to a motor;
a first capacitor connected to the first switching unit and configured to smooth voltage that is supplied from the electrical storage device to the first switching unit;
a step-down circuit connected to the first capacitor and configured to step down voltage of the first capacitor;
a second capacitor connected to the step-down circuit and configured to draw electric charge stored in the first capacitor; and
a discharging unit configured to discharge electric charge stored in the second capacitor, wherein
the step-down circuit includes a second switching unit,
the second switching unit is configured to adjust a rate, at which electric charge stored in the first capacitor is drawn by the second capacitor, by controlling a duty ratio, and
the step-down circuit is configured to decrease the voltage of the first capacitor to lower than or equal to a predetermined value within 5 seconds by controlling the second switching unit.

2. The drive system according to claim 1, wherein
the step-down circuit includes a reactor connected between the second switching unit and the second capacitor.

3. A drive system comprising:
a first switching unit configured to convert energy, stored in an electrical storage device, to electric power that is supplied to a motor;
a first capacitor connected to the first switching unit and configured to smooth voltage that is supplied from the electrical storage device to the first switching unit;
a step-down circuit connected to the first capacitor and configured to step down voltage of the first capacitor;
a second capacitor connected to the step-down circuit and configured to draw electric charge stored in the first capacitor; and
a discharging unit configured to discharge electric charge stored in the second capacitor, wherein
the step-down circuit includes a second switching unit,
the second switching unit is configured to adjust a rate, at which electric charge stored in the first capacitor is drawn by the second capacitor, by controlling a duty ratio, and
the step-down circuit is configured to control the duty ratio by feeding back a voltage that is applied to the second capacitor.

4. A drive system comprising:
a first switching unit configured to convert energy, stored in an electrical storage device, to electric power that is supplied to a motor;
a first capacitor connected to the first switching unit and configured to smooth voltage that is supplied from the electrical storage device to the first switching unit;
a step-down circuit connected to the first capacitor and configured to step down voltage of the first capacitor;
a second capacitor connected to the step-down circuit and configured to draw electric charge stored in the first capacitor; and a discharging unit configured to discharge electric charge stored in the second capacitor, wherein
the step-down circuit includes a second switching unit,
the second switching unit is configured to adjust a rate, at which electric charge stored in the first capacitor is drawn by the second capacitor, by controlling a duty ratio, and
the step-down circuit is configured to control the duty ratio by feeding back a current that flows into the second capacitor.

5. The drive system according to claim 1, wherein
the step-down circuit is configured to operate until the voltage of the first capacitor becomes lower than or equal to a predetermined value.

6. The drive system according to claim 1, wherein
the step-down circuit is configured to operate when a collision of a host vehicle is detected.

7. A vehicle comprising:
the drive system according to claim 1.

8. The drive system according to claim 3, wherein
the step-down circuit includes a reactor connected between the second switching unit and the second capacitor.

9. The drive system according to claim 3, wherein
the step-down circuit is configured to operate until the voltage of the first capacitor becomes lower than or equal to a predetermined value.

10. The drive system according to claim 3, wherein
the step-down circuit is configured to operate when a collision of a host vehicle is detected.

11. A vehicle comprising:
the drive system according to claim 3.

12. The drive system according to claim 4, wherein
the step-down circuit includes a reactor connected between the second switching unit and the second capacitor.

13. The drive system according to claim 4, wherein
the step-down circuit is configured to operate until the voltage of the first capacitor becomes lower than or equal to a predetermined value.

14. The drive system according to claim 4, wherein
the step-down circuit is configured to operate when a collision of a host vehicle is detected.

15. A vehicle comprising:
the drive system according to claim 4.

\* \* \* \* \*